United States Patent [19]

Förtsch et al.

[11] Patent Number: 4,689,048

[45] Date of Patent: Aug. 25, 1987

[54] PROCESS FOR THE PREPARATION OF FORMULATIONS OF WATER-SOLUBLE ORGANIC DYES BY TWO-STAGE MEMBRANE SEPARATION OF CRUDE DYE SUSPENSION

[75] Inventors: Bruno Förtsch, Ramlinsburg; Alberto Rabassa, Oberwil; Beat Bruttel, Böckten, all of Switzerland

[73] Assignee: Ciba-Geigy Corporation, Ardsley, N.Y.

[21] Appl. No.: 845,685

[22] Filed: Mar. 28, 1986

[30] Foreign Application Priority Data

Mar. 29, 1985 [CH] Switzerland ............................ 1371/85

[51] Int. Cl.$^4$ ................................................ C09B 67/54
[52] U.S. Cl. ............................................ 8/524; 8/527; 8/528; 8/680; 210/500.2; 210/650; 210/651; 210/683; 210/500.1
[58] Field of Search ............................. 8/524, 527, 528

[56] References Cited

U.S. PATENT DOCUMENTS

| 4,247,401 | 1/1981 | Bloch et al. ........................ 210/638 |
| 4,390,342 | 6/1983 | Bruttel et al. ........................... 8/527 |
| 4,523,924 | 6/1985 | Lacroix ..................................... 8/527 |
| 4,584,103 | 4/1986 | Linder et al. ........................ 210/650 |
| 4,604,204 | 8/1986 | Linder et al. ........................ 210/490 |

FOREIGN PATENT DOCUMENTS 184556  6/1986  European Pat. Off. .
1359898  7/1974  United Kingdom .

*Primary Examiner*—A. Lionel Clingman
*Attorney, Agent, or Firm*—Wenderoth, Lind & Ponack

[57] ABSTRACT

A process for the preparation of formulations of water-soluble organic dyes starting from an aqueous salt-containing suspension of the untreated dye and using membrane separation methods, which process comprises substantially freeing the aqueous suspension of the untreated dye from by-products and reducing the salt concentration by more than half in a first membrane separation treatment, then diluting the dye suspension in a further optional step and effecting deionization and concentration in a second membrane separation treatment and converting the concentrate so obtained into a liquid or solid commercial formulation. This multi-step membrane separation process, e.g. ultrafiltration combined with hyperfiltration, results in a high rate of permeation through the membrane and avoids operating problems caused by membrane clogging.

10 Claims, No Drawings

PROCESS FOR THE PREPARATION OF FORMULATIONS OF WATER-SOLUBLE ORGANIC DYES BY TWO-STAGE MEMBRANE SEPARATION OF CRUDE DYE SUSPENSION

The present invention relates to a process for the preparation of formulations of water-soluble organic dyes, to the formulations so obtained, and to the use thereof for dyeing and printing natural or synthetic fibre material.

Water-soluble organic dyes are usually obtained upon conclusion of synthesis in the form of dilute aqueous solutions which are contaminated with by-products and which, in addition, depending on the synthesis, contain inorganic salts, e.g. alkali metal chlorides or alkali metal sulfates. To prepare commercial formulations, these impure solutions must be concentrated and substantially freed from salts and by-products. A high salt concentration has in particular an adverse effect on the storage stability of liquid formulations, whereas by-products, which often also have an inherent colour, can result in a change of shade.

With the development of filtration methods employing membranes, it has recently been increasingly possible to remove salts and by-products from dye solutions in this simple yet effective manner and finally to adjust the solutions, by partial removal of water, to the required dye concentration (q.v. for example German Offenlegungsschrift 22 04 725).

In the course of such separation treatments, however, membrane clogging has often been observed. This clogging results in uneconomically long filtration times or in an only unsatisfactory degree of salt removal. To achieve better results, membrane separation methods such as hyperfiltration using modified membranes have been proposed (q.v. for example European published patent application EP-A-00 37 382). These are membranes which carry e.g. ionic groups at their surface, which are said to prevent the anionic or cationic dye from penetrating the fine membrane pores by electrostatic repulsion. However, even with such membranes it is not always possible to achieve satisfactory filtration times.

It is the object of the present invention to improve the existing separation methods, in particular to achieve a high rate of flow, to reduce clogging of the membranes and, quite generally, to ensure a high degree of operations reliability.

It has been found that the shortcomings of existing membrane separation methods can be overcome in simple manner by starting from an aqueous suspension of the untreated dye and substantially freeing it from by-products and reducing the salt concentration by more than half by means of an initial membrane separation treatment, then diluting the dye suspension in an optional further step and effecting salt removal by a further membrane separation treatment and, after concentration, finally converting the concentrated dye solution or suspension into a liquid or solid commercial formulation.

The salient feature of this procedure is that a suspension of the dye that is contaminated with salts and by-products is freed from the bulk of the salts in a first purification step, then diluted in a further optional step and subjected to a second membrane separation treatment to effect further deionisation and concentration.

This multi-step procedure, especially in the second separation step, results in appreciably fewer operating problems due to membrane clogging. Instead, higher rates of flow are attained and separation can be effected with a smaller membrane area.

Examples of water-soluble organic dyes are acid dyes (Colour Index (C.I.) acid and direct dyes) and basic dyes (C.I. basic dyes) such as metal complex dyes, chrome dyes, developed dyes and mordant dyes as well as in particula!r reactive dyes. Water-soluble organic dyes are in particular metal-free or metal-containing and metallisable monoazo, disazo and polyazo dyes which contain sulfonic acid or carboxylic acid groups, and pyrazolone, thioxanthrone, oxazine, stilbene, formazan anthraquinone, nitro, methine, triphenylmethane, xanthone, naphthazarine, styryl, azastyryl, naphthoperinone, quinophthalone and phthalocyanine dyes, as well as preferably those dyes which contain at least one fibre-reactive radical in the dye molecule.

The water-soluble anionic dyes which are processed in particular to dye formulations by the process of this invention are preferably the alkali metal salts or ammonium salts of acid wool dyes, reactive dyes or substantive wool dyes of the azo, anthraquinone and phthalocyanine series. Examples of suitable azo dyes are metal-containing or metal-free monoazo and disazo dyes as well as formazan dyes which contain one or more sulfonic acid groups. Eligible anthraquinone dyes are in particular 1-amino-4-arylaminoanthraquinone-2-sulfonic acids and suitable phthalocyanine dyes are in particular sulfated copper phthalocyanines or phthalocyanine arylamides.

Suitable water-soluble metal complexes are metal complex dyes which contain sulfonic acid or carboxylic acid groups, for example 1:1 or 1:2 metal complexes of azo or azomethine dyes or metallised phthalocyanines, preferably copper phthalocyanine or nickel phthalocyanine. Preferred 1:1 and 1:2 metal complexes are 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes of, in particular, o-carboxy-o'-hydroxyazo dyes, o-hydroxy-o'-aminoazo dyes or o,o'-dihydroxyazo dyes of the benzene-azobenzene, naphthalene-azonaphthalene, benzene-azonaphthalene, benzene-azopyrazolone, benzene-azopyridone or benzene-azoacetoacetamide type, which groupings may be unsubstituted or substituted. Examples of possible substituents are: unsubstituted or substituted sulfamoyl or sulfonyl, halogen or the nitro groups.

The copper and nickel phthalocyanines are derived from the customary mixtures with a differing degree of sulfonation and contain, for example, 2 to 3 or also 4 sulfated $\beta$- or $\gamma$-hydroxyalkylsulfamoyl groups, but may also additionally contain individual halogen atoms and individual sulfamoyl groups, wich last mentioned groups may be unsubstituted or substituted at the nitrogen atom, for example by lower alkyl such as methyl, ethyl, propyl, butyl or by hydroxy-lower alkyl groups such as 2-hydroxyethyl, 2-hydroxypropyl or 3-hydroxypropyl.

In the process of this invention it is advantageous to use the sulfo group containing azo dyes in the form of their metal salts, e.g. of their potassium or, preferably, sodium salts.

The reactive dyes contain, as suitable fibre-reactive groups, e.g. heterocyclic groups or an acyl group of a carboxylic acid, which groups contain at least one halogen atom which is removable under the dyeing conditions. Such groups are for example: s-triazinyl radicals which carry one or two halogen atoms such as chlorine, fluorine or bromine atoms at the triazine ring; pyrimidyl radicals which carry one to three halogen atoms such as chlorine and/or fluorine atoms or one or two arylsulfonyl or alkanesulfonyl groups at the pyrimidine ring; dichloroquinoxylinyl, 2-chlorobenzthiazolyl or chloroacetylamino groups or α,β-dibromopropionylamino groups.

Further suitable fibre-reactive groups are e.g.: halocyclobutane, mono- or bis(γ-halo-β-hydroxypropyl)amino groups, β-haloethylsulfamoyl radicals, β-haloethoxy groups, β-haloethylmercapto groups, γ-halo-β-hydroxypropylsulfamoyl groups or 2,3-epoxypropyl groups.

Water-soluble basic dyes are the customary salts and metal halide double salts, preferably zinc chloride double salts, of known cationic dyes, in particular of methine or azomethine dyes which contain e.g. an indolinium, pyrazolium, imidazolium, triazolium, tetrazolium, oxadiazolium, thiadiazolium, oxazolium, thiazolium, pyridinium, pyrimidinium or pyrazinium ring.

The above heterocycles may be substituted and/or fused to aromatic rings. Also suitable are cationic dyes of the diphenylmethane, triphenylmethane, oxazine, thiazine and 1,2-pyran series, as well as, finally, dyes of the arylazo and anthraquinone series.

The dyes can also be in admixture with each other or with dyes of another type.

The term "water-soluble organic dyes" employed in this specification shall also be understood as comprising water-soluble fluorescent whitening agents, in particular those of the stilbene series and, most preferably, of the bistriazinylaminostilbenedisulfonic acid, bis-styrylbiphenyl, bis-styrylbenzene and bistriazolylstilbenedisulfonic acid type. The sulfo group containing whitening agents are preferably in the form of their metal salts as obtained in the synthesis, e.g. lithium, potassium, magnesium or, preferably, sodium salts, as well as ammonium, amine or alkanolamine salts.

wherein M is hydrogen, an alkali metal ion, alkaline earth metal ion, ammonium ion or amine salt ion, each of $R_1$ and $R_2$ independently of the other is a member selected from the group consisting of $NH_2$, $NH-CH_3$, $NH-C_2H_5$, $N(CH_3)_2$, $N(C_2H_5)_2$, $NH-CH_2-CH_2OH$, $NH-CH_2-CH_2-CH_2-OH$, $N(CH_2-CH_2-OH)_2$, $N(CH_2-CH_2-CH_2OH)_2$, $N(CH_3)(CH_2-CH_2-OH)$, $NH-CH_2-CH_2-O-CH_2-CH_2-OH$, $NH-CH_2-CH_2-CH_2-SO_3M$, $OH$, $OCH_3$, $OCH(CH_3)_2$, $O-CH_2-CH_2-O-CH_3$,

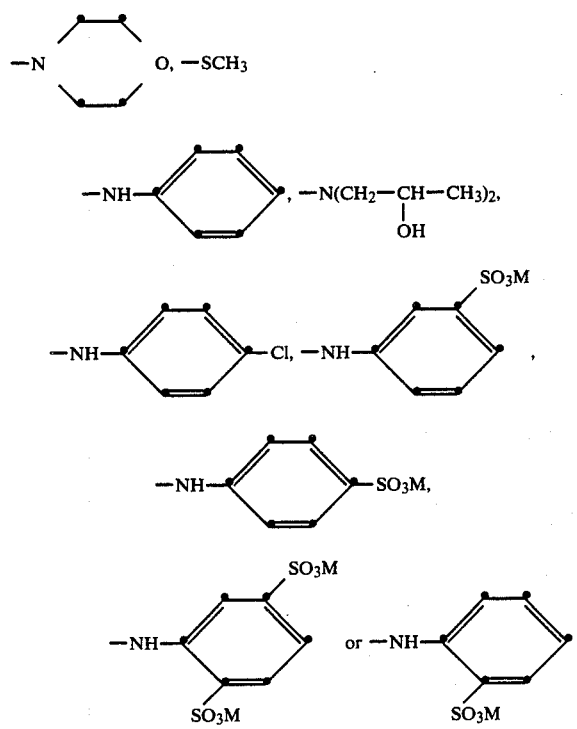

wherein M is hydrogen, an alkali metal ion, alkaline earth metal ion, ammonium ion or amine salt ion; or of the formula

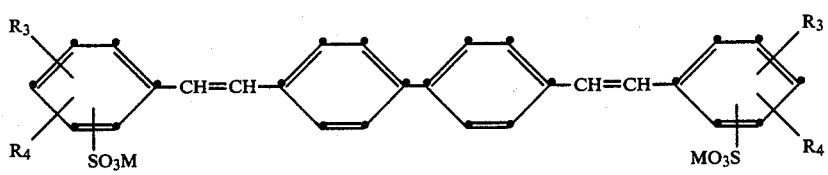

In the process of this invention, sulfo group containing stilbene whitening agents of the following formula are preferably processed to solid or liquid commercial formulations:

wherein $R_3$ is hydrogen, $C_1-C_4$alkyl, $C_1-C_4$alkoxy, halogen or $SO_3M$, $R_4$ is hydrogen or $C_1-C_4$alkyl, and M is hydrogen, an alkali metal ion, alkaline earth metal ion, ammonium ion or amine salt ion; and also of the formula

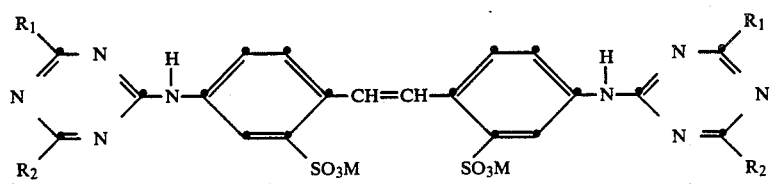

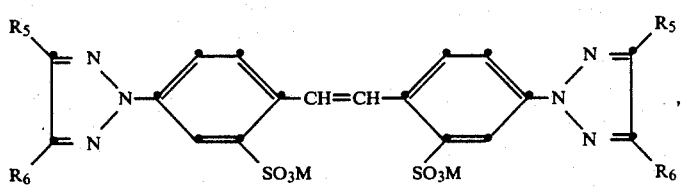

wherein M is a hydrogen atom, an alkali metal ion, alkaline earth metal ion, ammonium ion or amine salt ion, each of $R_5$ and $R_6$ independently of the other is hydrogen, $CH_3$,

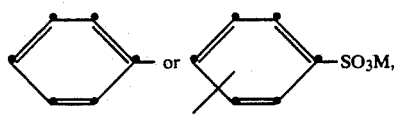

or $R_5$ and $R_6$, when taken together, complete a benzene ring.

These dyes and fluorescent whitening agents are prepared by known continuous or batch methods and are obtained at the conclusion of the synthesis in the form of a solution or suspension, depending on the precedure employed and on the solubility properties. If a suspension is obtained, it can be purified and deionised direct by the process of this invention and converted into the desired commercial formulation. If, on the other hand, the dye is obtained in the form of a solution which contains impurities, the dye is first precipitated e.g. by salting out or acidification and then subjected to the first membrane separation treatment. The particle size can be adjusted beforehand to the desired degree of fineness by wet grinding, with or without the addition of surfactants. It will be self-evident to those skilled in the art that, depending on the grinding times, dispersions can also be obtained. Accordingly, in the present context the term "dyestuff suspension" will be understood as also meaning a dispersion.

It will further be appreciated that not only synthesis suspensions can be processed to commercial dyestuff formulations by the process of this invention: it is also possible, for example, to start from untreated dyes in the form of the water-containing filter cake or also from dye powders. The dye filter cake or dye powder is first suspended in water, ground in an optional step, and then subjected to the first membrane separation treatment.

The membrane separation processes used in the practice of this invention are in particular the following membrane filtration processes:

microfiltration using porous membranes having a pore diameter of 0,2 to 40 μm ultrafiltration using finely porous membranes having a pore diameter of 10 Å to 1 μm hyperfiltration through ion-exchanger or solution-diffusion membranes having a pore diameter of <20 Å electrodialysis by applying an electric voltage and using ionexchanger membranes as diaphragms dialysis via a concentration gradient across ion-selective membranes.

Concerning the theory and practice of the membrane separation processes, reference is made e.g. to H. Strathmann, Chemie-Technik 7, 333 (1978) or W. Pusch and A. Walch, Angew. Chem. 94, 670 (1982).

As the dye is initially in the form of a suspension, it is convenient to use membranes with relatively large pores for the first membrane separation treatment so as to make possible a rapid removal of the bulk of the salts and to ensure an effective preliminary treatment. Accordingly, the first membrane filtration treatment will be in particular microfiltration or ultrafiltration.

Suitable membranes for the ultrafiltration are those made of organic material as well as those made of inorganic material. Organic membrane materials are e.g. polyvinylidene fluoride, cellulose acetate, polytetrafluoroethylene, polyacrylonitrile, polyethyleneimine, copolymers of polyacylonitrile and vinyl pyrrolidone, polysulfone, polyamide or also hydrophilised polyolefins, e.g. based on polypropylene. Chemically modified polyacrylonitrile membranes (e.g. those described in European patent application EP-A-25 973) which are obtained for example by reacting the basic polymer with hydroxylamine, a polyfunctional low molecular compound, a polymer which contains reactive groups and an ionic compound that is able to form a chemical bond with the polymer, and subsequently treated with available chlorine, e.g. with a hypochlorite solution, are also suitable ultra- or diafiltration membranes. Inorganic membranes are e.g. those made of porous metal or metal alloys (metal sinter membranes, e.g. of porous steel), or those made of porous carbon the surface of which may be coated with e.g. a thin layer of zirconium oxide, silica or alumina, or those made of porous glass or ceramic. Organic and inorganic membranes are conveniently used in tubular form, the tubes being combined into a tube membrane module. It is preferred to use for example the following membranes (the figures in brackets indicate the cut-off level): polyacrylonitrile membrane (~100,000), cellulose acetate membrane (~5,000 or ~20,000), polysulfone membrane (~10,000), zirconium oxide (coated porous carbon membrane (~20,000 or ~40,000).

Depending on the membrane separation unit employed, the membranes may not only be in tubular form but also in plate, hose or hollow fibre form.

The ultrafiltration can be carried out under pressure as well as by applying a vacuum. Further, the dyestuff suspension may be under pressure while simultaneously a vacuum is applied to the permeate. In general, a pressure of 0.5 to 10 bar or a vacuum of 200 to 20 mbar is applied. It is advantageous to carry out the ultrafiltration by applying a vacuum, as the membrane is prevented from becoming clogged and the rate of permeation through the membrane is appreciably increased if the permeate is under vacuum.

In particular, chemically stable zirconium oxide membranes with a cut-off in the range from 5000 to 500,000 are used as membrane material for the ultrafiltration.

As the dye particles may normally be in the form of large aggregates, a microfiltration may also be carried out instead of the ultrafiltration. Because of the high rate of flow, a microfiltration permits a rapid separation of the bulk of the salts and low molecular by-products from the synthesis dispersion. It is preferred to use metal filters for this procedure, e.g. those made of stainless steel having a pore diameter from 0.2 to 40 μm, in particular from 0.2 to 10 μm, or porous polypropylene membranes having a pore diameter from 0.2 to 1 μm.

To prevent as far as possible the dye from dissolving during the ultra- or microfiltration, it is expedient to replace the separated permeate with a dilute salt solution instead of with water when processing readily water-soluble dyes and in this manner to wash out by-products from the dyestuff suspension without any appreciable loss of dye.

This first membrane separation treatment, the object of which is to remove the bulk of the by-products from the suspension of the untreated dye and to reduce the salt concentration to less than half, is followed in the process of this invention by a second membrane separation treatment. The dyestuff dispersions which are treated in this second membrane separation treatment can be prepared therefor e.g. by further measures, for example by diluting them with water and carrying out a filtration step to remove insoluble matter, which treatment may also take the form of an ultrafiltration.

Upon conclusion of the second membrane separation treatment, it is also possible to carry out yet further steps for purifying (deionising) and concentrating, also using membranes.

Thus before subjecting the pretreated dyestuff suspension (concentrate of the first membrane separation treatment) to this second membrane separation treatment, it is advantageous to dilute it first with water. If the suspension has a dye concentration of normally 2 to 20% by weight before the first membrane separation treatment, this concentration is in the range of about 10 to 30% by weight after the first separation treatment and is then lowered again by dilution to 5 to 20% by weight. It is generally desirable that the dye should dissolve when diluting the suspension. Depending on the water solubility of the dye, dilution is made with 1 to 3 times the volume of water. It is expedient to mix the dilute suspension thoroughly, with warming, as may be required. Mixing is conveniently effected with a high-speed dispersing impeller, by ultrasonics, or in a mixing chamber fitted with baffles, preferably incontinuous flow treatment.

The second membrane separation treatment consists principally of a hyperfiltration. This is a molecular separation method which is carried out using semi-permeable membranes with a cut-off in the molecular weight range from 300 to 1000, preferably from 400 to 800. Such membranes permit water and dissolved substances whose molecular weight is below the cut-off level to pass through under low to medium pressure. Pressures in the range from 10 to 100 bar, preferably from 10 to 30 bar, are normally applied.

The preferred membranes employed in the process of this invention on account of their good separating properties consist substantially of a polymeric material which is chiefly modified at the surface by acid or basic groups.

The polymeric material is a natural, regenerated or synthetic material which contains e.g. hydroxyl, amino and/or amidoxime groups as reactive groups. Such materials can be reacted with suitable reagents which, on the one hand, contain acid or basic groups and, on the other, at least one reactive group, to form a chemical (covalent) bond.

The acid groups are preferably carboxyl and sulfonic acid groups, and the basic groups are primarily secondary or tertiary amino groups, and also phosphonium or sulfonium groups.

The following polymeric compounds, for example, may be modified in the indicated manner:
cellulose acetates, e.g. those having a low content of acetyl groups, but also higher acylated cellulose, e.g. 2½-acetate, or
polyvinyl alcohols, or
polyacrylonitrile and copolymers of acrylonitrile and other monomers having ethylenic unsaturation.

Suitable reactive reagents which contain an acid or basic group are colourless and coloured compounds, preferably reactive dyes which may belong to different classes, e.g. anthraquinone, azo or formazan dyes. They may also be in the form of metal complexes.

Particularly useful and versatile polymer membranes are those which are modified by an azo dye which contains sulfonic acid groups. The azo dye may also contain a complexed metal, e.g. copper. Such membranes are described e.g. in German Offenlegungsschrift 25 05 254 and in European patent application EP-A-25 973, EP-A-26 399 and EP-A-47 953.

The membranes employed in the process of this invention preferably have a pore diameter of 0.1 to 50 nm.

Further suitable membranes by means of which good deionisation is achieved are e.g. those based on unmodified or modified polysulfone (e.g. European patent application EP-A-61 424), polyamide or polystyrene (European patent application EP-A-82 355).

However, it is preferred to use anionically modified polyacrylonitrile, polysulfone or cellulose acetate membranes with a cut-off in the range from 400 to 800.

As previously mentioned, the dye solution normally contains 5 to 20% by weight of dye before the membrane separation process and is concentrated until the dye concentration has risen to 15–50% by weight. Simultaneously, the salt concentration falls to below 5% by weight, preferably to below 2% by weight. To achieve this low final salt concentration, the salt-containing filtrate, at the start of the hyperfiltration, will normally be replaced wholly or partly, continuously or discontinuously, with water, conveniently with demineralised water. In this manner, salts and low molecular by-products are washed out of the dye solution, while the dye content initially remains more or less content. Depending on the degree of concentration or on the solubility of the dye, there is obtained at the conclusion of the hyperfiltration a dye solution or suspension with a more or less high concentration of undissolved dye, which solution or suspension is subsequently fed to the standardisation vessel.

Once the pretreated dye suspension has been diluted to form a solution before carrying out the hyperfiltration, it is expedient to free this solution, before the hyperfiltration, from any undissolved matter by means of a further intermediate membrane separation treatment. Some of these by-products are water-insoluble or only sparingly water-soluble compounds which are present in the dye solution in finely dispersed form. To remove these undissolved solids, it is best to subject the dye solution to a further ultrafiltration. The permeate thereby obtained is a clear dye solution which contains virtually no solids.

This further ultrafiltration (intermediate step) is in turn preferably carried out with a zirconium oxide membrane with a cut-off in the range from 5000 to $1 \times 10^6$, preferably from 10,000 to 500,000. It is expedient to carry out this ultrafiltration under a pressure of 0.5 to 10 bar.

Instead of the ultrafiltration, it is possible to carry out a microfiltration, depending on the degree of fineness of the insoluble matter, e.g. using microporous metal tubes or polypropylene membranes.

Alternatively, the pretreated dye suspension, after dilution with water, can be subjected to a multi-step ultrafiltration (second membrane separation treatment) to remove initially any insoluble matter and then deionisation and concentration of the dye solutions can be effected by using membranes with decreasing cut-off levels, e.g. from 500,000 to 50,000 or to 5000.

The dyestuff concentrates so obtained can then be converted into liquid and solid dye formulations.

The permeates—if they still contain dye residues—can be further purified by a subsequent hyperfiltration. The concentrates obtained after the hyperfiltration are normally recycled to the synthesis suspension of the untreated dye.

If the salt concentration of the synthesis suspension is low and contamination with by-products is insignificant, it is possible to dilute the suspension, without a preliminary deionisation, until the dye dissolves, then to remove insoluble solids by micro- or ultrafiltration and finally to effect deionisation and concentration by hyperfiltration.

Further, instead of the hyperfiltration it is possible to carry out a combined hyperfiltration and dialysis, in particular a Donnan dialysis. Such a combination of membrane separation treatments is advantageous whenever it is desired to prepare storage-stable solutions of dyes that have only insufficient water-solubility. As the solubility properties of anionic and cationic dyes is heavily dependent on the corresponding colourless counterion, the sparingly soluble dye can be converted in simple manner into a readily water-soluble dye salt by an ion exchange reaction by means of a Donnan dialysis (q.v. European patent applications EP-A-0 097 125 and 0 126 830).

Dye and fluorescent whitener salts of good water-solubility are necessary to prepare the concentrated dye and fluorescent whitener solutions which are increasingly available at the present time in the form of liquid formulations, for this is the only way in which the solvent concentration of the formulations can be kept as low as possible. In addition, good solubility of the dye or fluorescent whitener is advantageous for the preparation of solid formulations, as the possibility thereby afforded of using highly concentrated starting solutions means that drying can be carried out under mild conditions and with a low energy consumption.

The process of this invention in its preferred embodiment comprises three membrane separation treatments and is divided into the following individual steps:
ultrafiltration or microfiltration of the aqueous dispersion or suspension of the crude dye to separate the bulk of the salts and of the by-products;
diluting the dye suspension of dispersion and preparing a dye solution;
ultrafiltration of the dye solution to remove insoluble matter -the dye solution passes as permeate through the ultrafiltration membrane and the concentrate is normally recycled to the aqueous dispersion or suspension of the crude dye;
hyperfiltration of the dye solution, whereby the residual salt concentration of the solutions falls to below 0.1% by weight and the dye concentration is increased to 15–30% by weight.

For reasons of efficiency it is especially advantageous to carry out the dye synthesis and the subsequent membrane treatment continuously, i.e. the dye suspension originating continuously from the synthesis is fed direct into a casacade of membrane units as described in detail above, including the mixing chamber, to the solution of the dye and issues therefrom ultimately in the form of a concentrated dye solution of low salt content which can be further processed to a commercial liquid or solid formulation.

To prepare a commercial liquid formulation it is only necessary to adjust the pH value of the dyestuff solution, optionally after the addition of the assistants conventionally employed for liquid formulations, e.g., foam inhibitors, antifreeze agents, humectants, buffer substances and/or microbicides, to a predetermined final dye concentration by dilution and/or with the aid of extenders. The dyestuff solution can also be converted into a solid dye formulation by drying, after the optional addition of assistants such as binders, dust inhibitors, dispersants and/or extenders. Owing to the increased dye concentration, less energy is required for drying. Conventional drying methods are employed, in particular spray drying.

The above assistants may, of course, not only be added before their ultimate formulation, but can be added to the suspension or solution of the crude dye before or during the process. Addition of the assistant or assistants during the process is naturally only appropriate if they are not removed from the suspension or solution in the course of one of the membrane separation treatments.

The dye formulations are used for the preparation of dyebaths, padding liquors or printing pastes which, depending on the dye, are suitable for dyeing and printing natural and synthetic fibre materials, e.g. cotton, wool, silk, acrylic or polyamide textiles, or blends of such materials, e.g. wool/polyamide, whereas the fluorescent whitener formulations are used for whitening textiles, leather or paper.

The following Examples will serve to illustrate the invention. Parts and percentages are by weight. The rate of permeation through the membrane is expressed in liters of permeate per $m^2$ of membrane surface area and day [$l/m^2.d$].

EXAMPLE 1

5000 parts of a synthesis suspension of the reactive dye of the formula (in the form of the sodium salt)

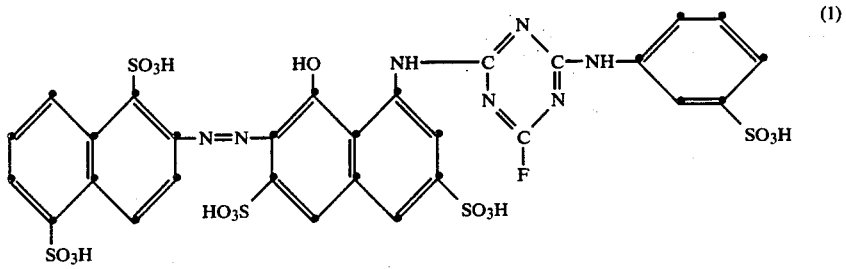

containing
- 8.7% of dye
- 4.1% of sodium chloride
- 0.8% of organic by-products
- 86.4% of water and having a pH of 5.6 are subjected to ultrafiltration to separate by-products and the bulk of the salt. A microporous zirconium oxide membrane in tube form (tubular graphite matrix coated on the inside with zirconium oxide) having a molecular weight cut-off of 20,000 is used for the ultrafiltration. The ultrafiltration is carried out under a pressure of 4 bar, a rate of flow of 4 m/sec, a rate of permeation through the membrane of 6300 l/m².d and at a temperature of 20° C. After 3 hours a dye suspension of the following composition is obtained:
- 15.6% of dye
- 1.1% of sodium chloride
- 0.3% of organic by-products
- 83.0% of water.

The dye suspension is then diluted with twice the volume of deionised water and and the dilute suspension is stirred briefly with an impeller at 28° C. The dye dissolves and a turbid solution is obtained. This solution is subjected to another ultrafiltration to separate undissolved matter, again using a zirconium oxide membrane, but one having a cut-off of 40,000. The membrane permits the clear dye solution to pass through while undissolved particles are retained. The clear filtrate has the following composition:
- 5.2% of dye
- 0.4% of sodium chloride
- 0.1% of organic by-products.

The residual solids-containing concentrate is recycled to the suspension of the untreated dye. The clear dye solution is then fed to a hyperfiltration unit for further deionisation and concentration. This unit is equipped with a modified polyacrylonitrile membrane having a cut-off of about 500.

The hyperfiltration is carried out under a pressure of 28 bar and at a circulation rate of 12 l/m, a rate of permeation through the membrane of 500 l/m².d and a temperature of 20° C. After 4 hours a concentrated dye solution of the following composition is obtained:
- 22.6% of dye
- 0.04% of sodium chloride
- 0.15% of organic by-products
- 77.2% of water.

The dye solution can be standardised direct and further processed to a liquid commercial formulation or to a solid formulation.

To prepare storage-stable liquid commercial formulations, 10 to 20 parts of a sodium tripolyphosphate solution as buffer substance can be added to e.g. 80 to 90 parts of dye solution. The ready for use formulations have a pH of c. 7.5 and are perfectly storage-stable for several months in the temperature range from −10° to +40° C.

Instead of using the reactive dye of formula (1), it is also possible to use a synthesis suspension of a direct dye and to obtain comparable results.

EXAMPLE 2

A synthesis suspension (500 parts) of the reactive dye of the formula (in the form of the sodium salt)

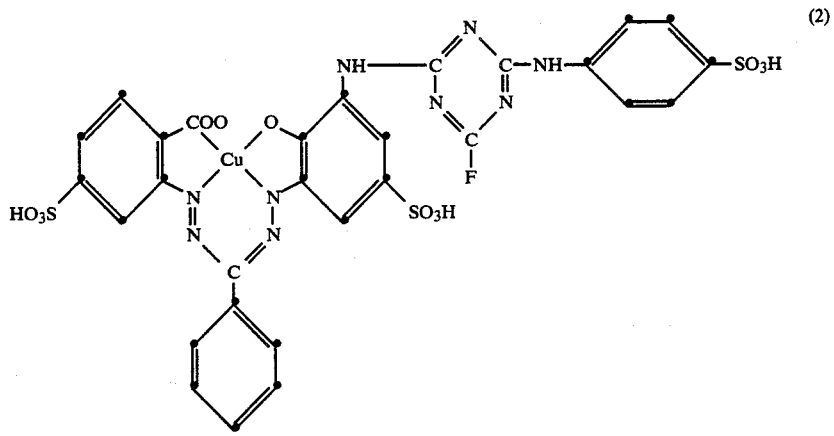

with a dye content of 14%, a sodium chloride concentration of 7.2% and a pH of 5 is freed from the bulk of salt by microfiltration. The microfiltration is carried out using a porous stainless steel tube with a pore diameter of c. 5 μm, under a pressure of 2.5 bar and at a temperature of 18° C. The rate of flow of the dye suspension is 5 m/sec. The amount of permeate is 5300 l/m².d. After 5 hours the salt concentration has fallen to 3.8% and the dye concentration has risen to 28.5%.

The dye solution is subsequently diluted with water to about half its concentration and mixed until the dye has dissolved. The turbid solution is then freed from insoluble matter by ultrafiltration. A zirconium oxide membrane (tubular graphite matrix) with a cut-off of 40,000 is used as ultrafiltration membrane. The membrane allows the clear dye solution to pass through while retaining the undissolved particles. The ultrafiltration is carried out under a pressure of 4 bar and at a rate of flow of 4 m/sec. The clear dye solution has a salt content of 2.4% and a dye concentration of 19%.

A further desalting and concentration of the dye solution is effected by hyperfiltration with a modified polyacrylonitrile membrane (anionically modified) with a cut-off of 500 to 800. The dye solution is under a pressure of 25 bar and is pumped through the membrane module at a circulation rate of 12 l/min. The rate of permeation through the membrane is 800 l/m².d. After 7 hours the salt concentration has fallen to below 0.1% and the dye content of the solution is 24.6%. The dye solution can be standardised direct and further processed direct to a liquid formulation or to a solid formulation.

If the synthesis suspension is subjected to hyperfiltration after dilution direct, without undergoing the micro- or ultrafiltration step, then a substantially lower rate of permeation through the membrane of only c. 400 l/m².d is achieved, i.e. more time is needed to achieve the same degree of desalting and the required final dye concentration.

EXAMPLE 3

A synthesis suspension (5000 parts) of the metal complex dye of the formula (in the form of the sodium salt)

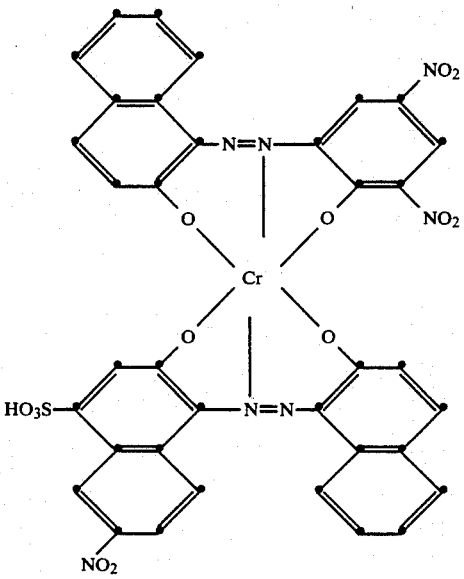

containing
6.2% of dye
12.6% of sodium chloride
2.1% of organic by-products
79.1% of water is initially freed by ultrafiltration from the bulk of the salt and the by-products. A microporous zirconium oxide membrane or a microporous ceramic membrane with a cut-off in the range of c. 20,000 is used for the ultrafiltration, which is carried out at a temperature of c. 20° C. The rate of permeation through the membrane is 3000 l/m².d. After 8 hours the synthesis suspension is almost free of organic by-products and the salt concentration has fallen to about one tenth of the original amount present, whereas the dye concentration of the suspension has risen to c. 20%. Before the subsequent ultrafiltration, the dye suspension is diluted to a dye concentration of 9.8% and some of the dye goes into solution. The hyperfiltration is carried out as described in Example 1. The membrane flux is 800 l/m².d. After 1½ hours a dyestuff suspension of low salt content and having a dye concentration of 30.1% is obtained. The concentrated suspension can be converted by spray drying into a commercial granular formulation after addition of extenders and the optional addition of a binder, a surfactant and dust inhibitors.

EXAMPLE 4

A salt-containing synthesis suspension (5000 parts) of the cationic dye of the formula (in the form of the sulfate)

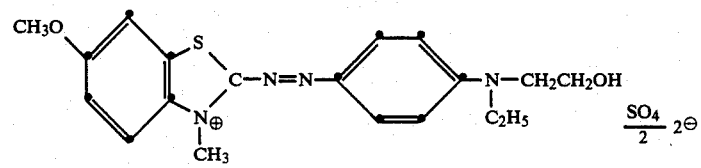

containing
20.3% of dye
6.8% of sodium sulfate 0.9% sodium chloride
0.8% of organic by-products
71.2% of water is freed initially from sodium sulfate by ultrafiltration while replacing the permeate continuously with a dilute solution of sodium chloride to prevent the dye from dissolving. In this manner the sodium sulfate is washed out of the dye almost completely. Final concentration after 6 hours: sodium sulfate 0.9%, organic by-products less than 0.2%. The ultrafiltration is carried out using graphite tubes coated on the inside with zirconium oxide, silia or alumina (cut-off c. 5000 to 50,000). The rate of permeation through the membrane is 4000 l/m².d. The dye concentration increases during the ultrafiltration only insignificantly to 22.4%. The actual concentration is also effected here by ultrafiltration. This is done by initially diluting the dye suspension to about half its concentration, whereby the dye dissolves almost completely. The hyperfiltration is carried out as described in Example 1 (rate of permeation through the membrane 500 l/m².d) and affords after 6 hours a concentrated solution having a dye concentration of 43.2%. The dye has partly precipitated again during the hyperfiltration and is in suspension.

EXAMPLE 5

A synthesis suspension (5000 parts) of the fluorescent whitening agent of the formula (as sodium salt)

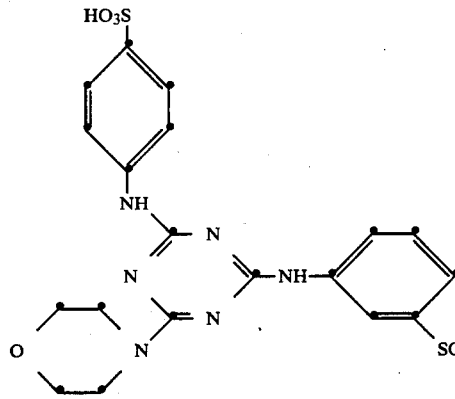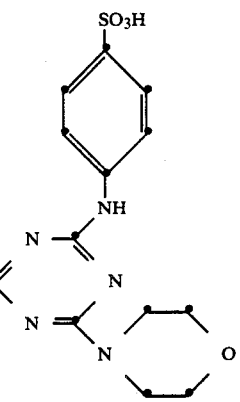 (5)

containing
13.1% of fluorescent whitening agent
5.3% of sodium chloride
2.1% of organic by-products
79.5% of water is subjected to ultrafiltration to separate by-products and the sodium chloride originating from the synthesis. A zirconium oxide membrane is used for the ultrafiltration, but comparable results are also obtained with a polyacrylonitrile, cellulose acetate or polysulfone membrane. The molecular weight cut-off of the membranes employed is in the range from 5000 to 500,000. The rate of permeation through the membrane is c. 5000 l/m².d. After 5 hours the suspension of the fluorescent whitener has the following composition:

25.0% of fluorescent whitening agent
0.9% of sodium chloride
0.2% of organic by-products
73.9% of water.

Without being diluted, the suspension of the fluorescent whitening agent is immediately afterwards fed to the hyperfiltration unit and further concentration is effected over 1½ hours. The concentration of fluorescent whitening agent is finally 40%. The hyperfiltration is carried out a described in Example 1. The rate of permeation through the membrane is 500 l/m².d. Instead of using a modified polyacrylonitrile membrane, it is also possible to use with comparably good results, i.e. with comparable concentration, a modified polysulfone membrane whose molecular weight cut-off level is also in the range from 400 to 800.

The suspension of the fluorescent whitening agent can be processed by spray drying in a jet atomiser (air inlet temperature c. 300° C., air exit temperature c. 120° C.) to a free-flowing granular formulation. Because of the high solids content in the spray slurry, appreciably less energy is required than when spray drying dilute whitener suspensions or solutions.

What is claimed is:

1. A process for the preparation of formulations of water-soluble organic dyes which comprises
   (a) treating in a first membrane separation step an aqueous salt-containing dye suspension by either
       a microfiltration step using a metal filter having a pore diameter of 0.2 to 40 micron
       or
       an ultrafiltration step using a membrane having a pore diameter of 10 Å to 1 micron and being made of porous glass, ceramic, steel, zirconium oxide-coated porous carbon, or of polyacrylonitriles, cellulose acetates or polysulfones to separate by-products and to reduce the salt concentration by more than half,
   (b) optionally diluting the dye suspension obtained in step (a) with water to yield a dye solution,
   (c) effecting deionisation and concentration of the dye suspension or solution by hyperfiltration in a second membrane separation step using anionically modified polyacrylonitrile, polysulfone or cellulose acetate membranes with a cut-off level in the range of from 400 to 800,
   and
   (d) converting the dye concentrate obtained in step (c) into a liquid or solid commercial formulation.

2. A process according to claim 1, wherein the ultrafiltration is carried out using a zirconium oxide coated porous carbon membrane having a cut-off level in the range from 5000 to 500,000.

3. A process according to claim 1, wherein the ultrafiltration is carried out by applying a vacuum of 200 to 20 mbar to the permeate while simultaneously applying a pressure of 0.5 to 10 bar to the dye suspension.

4. A process according to claim 1, wherein the dye is dissolved by diluting the dye suspension before carrying out the second membrane separation treatment.

5. A process according to claim 4, wherein the dye solution is freed from insoluble constituents before carrying out the second membrane separation treatment.

6. A process according to claim 1, which comprises subjecting the suspension of the untreated dye to ultra- or microfiltration in a first membrane separation treatment and converting the resultant dye suspension by dilution with water into a dye solution which is then subjected to ultrafiltration to remove insoluble matter and finally deionised and concentrated by hyperfiltration.

7. A process according to claim 1, which comprises subjecting the suspension of the dye to ultra- or microfiltration in a first membrane separation treatment, converting the dye suspension so obtained into a dye solution by dilution with water, then subjecting said solution to a multi-step ultrafiltration as second membrane separation treatment using membranes with decreasing molecular weight cut-off levels to remove insoluble matter and salts and to effect concentration, converting the concentrate so obtained into a solid or liquid commercial formulation and subjecting the permeate to hyperfiltration and recycling the resultant concentrate of the hyperfiltration to the suspension of the untreated dye.

8. A process according to claim 1, which comprises purifying, deionising and concentrating an aqueous suspension of a reactive dye and converting the concentrate into a solid or liquid commercial formulation.

9. A solid or liquid formulation obtained by a process as claimed in claim 1.

10. A process for dyeing or printing natural or synthetic fibre material, which comprises applying to the material a dye formulation as claimed in claim 9.

* * * * *